United States Patent
Sato

(10) Patent No.: US 6,252,709 B1
(45) Date of Patent: *Jun. 26, 2001

(54) POLARIZER AND A PRODUCTION METHOD THEREOF

(75) Inventor: Yasushi Sato, Tsuzuki-gun (JP)

(73) Assignee: Kyocera Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,288

(22) Filed: Sep. 29, 1997

(30) Foreign Application Priority Data

Sep. 30, 1996 (JP) .................................... 8-258111

(51) Int. Cl.$^7$ .............................. G02B 27/28; B05D 5/06
(52) U.S. Cl. ...................... 359/492; 359/490; 427/163.1
(58) Field of Search .................................... 359/490, 493, 359/492; 427/163.1

(56) References Cited

U.S. PATENT DOCUMENTS

| | | | |
|---|---|---|---|
| 4,049,338 | 9/1977 | Slocum . | |
| 4,351,381 | 9/1982 | Kamerling . | |
| 4,396,642 | * 8/1983 | Bolt et al. | 427/54.1 |
| 4,486,213 | 12/1984 | Lentz | 69/30.11 |
| 5,122,907 | 6/1992 | Slocom | 359/797 |

FOREIGN PATENT DOCUMENTS

| | | | |
|---|---|---|---|
| 2228608 | 9/1990 | (JP) | G02B/5/30 |
| 7056018 | 3/1995 | (JP) | G02B/5/30 |
| 7294738 | 11/1995 | (JP) | G02B/5/30 |
| 7301710 | 11/1995 | (JP) | G02B/5/30 |
| 8184784 | 7/1996 | (JP) | G02B/27/28 |

OTHER PUBLICATIONS

Katsu, Jun–ichiro, Kazutaka Baba and Mitsunobu Miyagi, "Fabrication of Stretched Gold Island Films with Large Optical Anisotropy," Electronics and Communications in Japan, Part 2, vol. 7, (1993)May, pp. 21–25.

Katsu et al., Fabrication of Stretched Gold Island Films with Large Optical Anisotropy, Electronics and Communications in Japan Part II Electronics No. 5, New York, US, May 1993.*

* cited by examiner

Primary Examiner—Cassandra Spyrou
Assistant Examiner—Jared Treas
(74) Attorney, Agent, or Firm—Hogan & Hartson, LLP

(57) ABSTRACT

A polarizing layer H1, comprising a large number of particles having morphological anisotropy dispersed in a dielectric, is sandwiched between major surfaces of two dielectric substrates 1, 2 having transparency, and the two dielectric substrates are jointed. The jointed two dielectric substrates are given thermal plastic deformation in a certain direction to give the metal particles of a laminated layer 7 morphological anisotropy and orientation to turn it into the polarizing layer H1.

11 Claims, 4 Drawing Sheets

FIG. 1
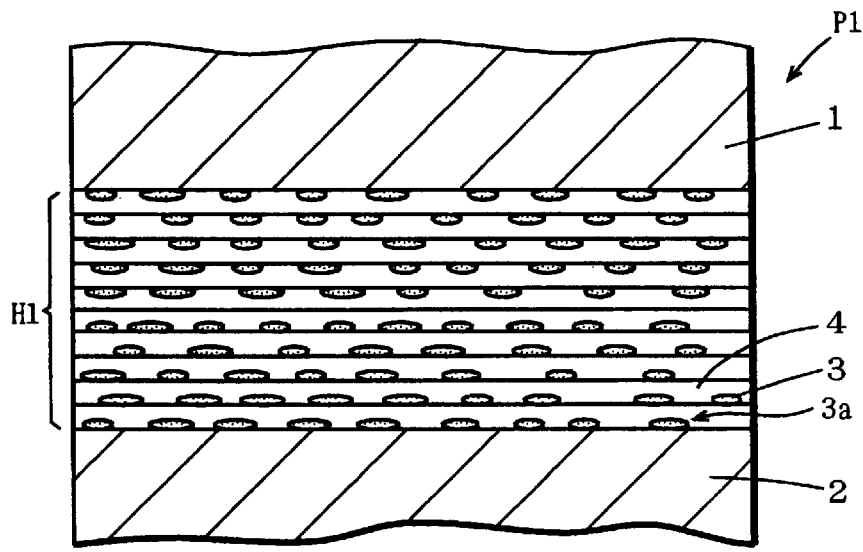
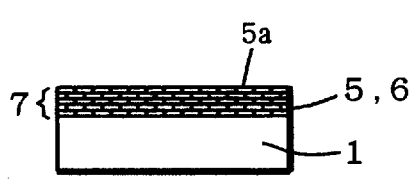
FIG. 2(a)
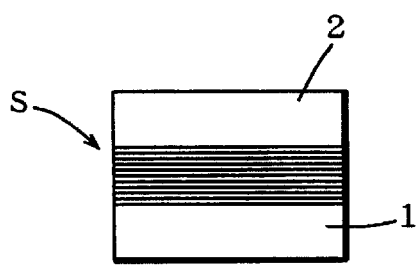
FIG. 2(c)
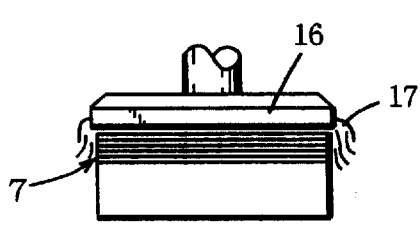
FIG. 2(b)
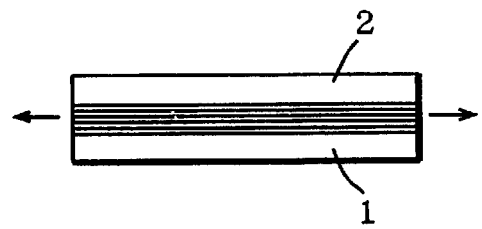
FIG. 2(d)
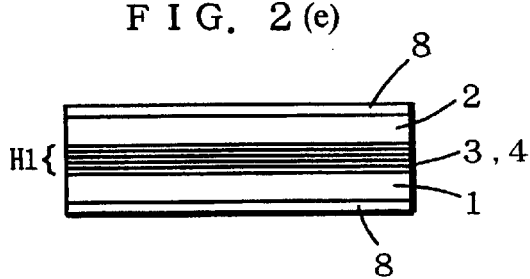
FIG. 2(e)

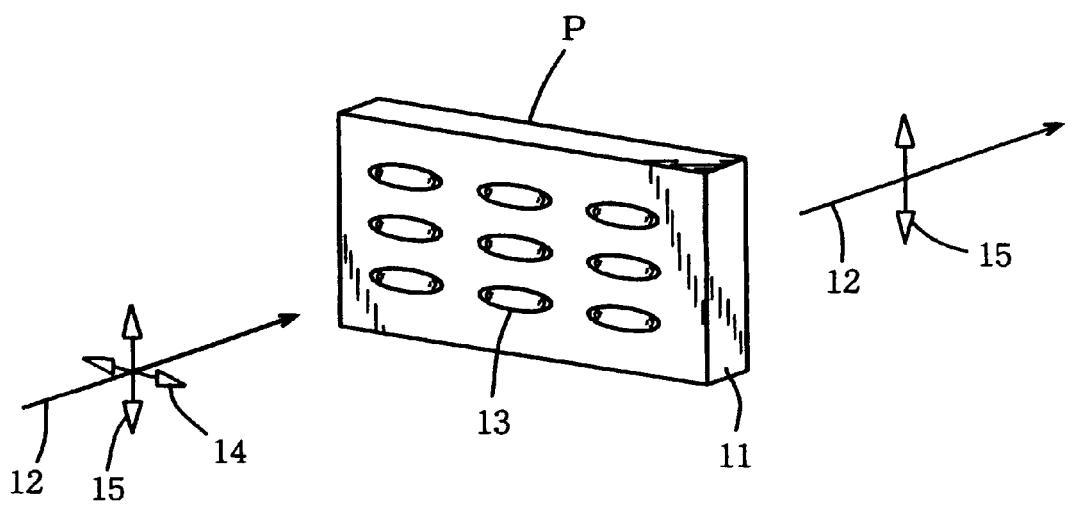

POLARIZER AND A PRODUCTION METHOD THEREOF

FIELD OF THE INVENTION

The present invention relates to a polarizer that is used in optical communication equipment, optical recording equipment, optical sensors, etc., and in particular, to a polarizer of high extinction ratio and high reliability that can be used effectively in optical isolators used in optical communication equipment.

PRIOR ART

For a long time polarizers have existed that use optical anisotropy obtained by stretching a material. For example, polarizing films and the like have been well known that use polymer films.

Polarizers are also known that exhibit polarization in infrared ranges due to minute anisotropic metal particulates dispersed in a glass. Such polarizers are used extensively in the field of optical communication because these polarizers have smaller losses and higher durability than those polarizers that use polymer films. The former polarizers are produced in the following manner. A glass piece containing silver halide is heat-treated to coagulate silver halide. Then the glass piece is heated and stretched to deform minute coagulated silver halide particles into spheroids, and at the same time, to orient a large number of spheroidal particles in the direction of the longer axis. After that, the silver halide is reduced to metallic silver to impart a polarizing property and produce a polarizer (please refer to Japanese Provisional Patent SHO 56-169140, etc.; hereinafter the process is referred to as the melting method).

As shown in FIG. 7, in a polarizer P, metallic particulates 13 in the shape of spheroid are dispersed in a glass piece 11, and the metallic particulates 13 absorb a polarized component 14 of a transmitted/incident light ray 12 in the direction of the longer axis of the metallic particulates 13 and transmit a polarized component 15 of the light ray 12 in the direction of the shorter axis thereof. As a result, the device works as a polarizer P.

Polarizers produced by the melting method, however, require introduction of a reducing gas to reduce silver halide into metallic silver. As this reducing gas tends to react with other materials, careful handling is required. Moreover, the reducing gas is expensive.

The reduction proceeds from the surface of silver halide, and the final depth of the reduced portion is about several tens of micrometers from the surface. Hence most of the silver will remain unchanged, in the form of silver halide. Accordingly, in terms of utilization of the materials, the efficiency of use of silver halide is extremely low. Moreover, in terms of optical characteristics, silver halide, that does not involve in the polarizing property, increases the insertion loss.

In response to these problems, the following polarizer has been proposed, wherein, just like those mentioned above, metal particles are dispersed in a glass. In this polarizer, to disperse metal particles, a thin film making process such as vacuum evaporation is used to alternately form metal films and dielectric films on a dielectric substrate such as a glass piece. In the metal films the metal is dispersed insularly to form films of insular metal particles. The dielectric films are made from, for example, a glass. Anisotropy is imparted to the insular metal particles by heating and stretching the substrate after the film formation (hereinafter the process is called the thin film method). In comparison with the melting method, this thin film method has some merits, for example, that reduction is not required and the production process is easy (for example, Denshi Joho Tsushin Gakkai, Autumn General Meeting of 1990, Preprints C-212).

However, in polarizers produced by the thin film method, surface deformation such as swell, and surface roughness may be generated as a result of the heating and stretching processes. The surface deformation, in turn, will deflect the incident light ray, and the surface roughness will increase the insertion loss; both deformation and roughness will deteriorate the polarizing property of the finished product.

Furthermore, generally speaking, it is necessary, for optical devices, to form antireflection films on the surface. To this end, the surface must have high cleanliness and smoothness. Adjustment of the device thickness may be required in some cases. It, therefore, is necessary to polish the surface by chemical polishing, mechanical polishing, etc. The conventional thin film method, however, does not expect or anticipate any working after the heating and stretching. Hence polishing may damage a layer that generates polarization.

Methods for giving thermal plastic deformation to the dielectric substrate include, other than the stretching, extrusion with a mold, drawing with a mold, rolling with rollers, etc. According to the working methods other than stretching, the work proper will contact the mold or rollers, and the surface layers of the work proper will be degraded by pressurization. Hence thermal plastic deformation has been limited to the stretching method. In the thin film method, relative to the melting method, it is difficult to raise the density of the dielectric glass, and the external atmosphere may penetrate and deteriorate the polarizing property.

SUMMARY OF THE INVENTION

The present invention is intended to provide a polarizer that is produced by the thin film method, that can undergo thermal plastic deformation given by some -methods other than the stretching method, that has durability even when the surface is polished after thermal plastic deformation, and that has a very good long-term reliability, and a production method thereof.

To accomplish the above objective, according to the present invention, between the major surfaces of at least two dielectric substrates having transparency, at least a polarizing layer wherein a large number of particles having morphological anisotropy are oriented in at least a dielectric layer is placed, and at least said two dielectric substrates are jointed to form a polarizer. Preferably, an antireflection film is provided on the outer major surface of each of at least two dielectric substrates.

According to the production method of the polarizer of the present invention, metal particle layers comprising a large number of metal particles and dielectric layers are alternately built up to form a laminated layer on one major surface of at least one of two dielectric substrates having transparency, then the above two dielectric substrates are jointed, in such a way that the above laminated layer is put between the two dielectric substrates, to form a jointed substrate, after that, the jointed substrate is subjected to thermal plastic deformation in a certain direction to give the metal particles in the above laminated layer morphological anisotropy and orientation, and in turn, to turn the laminated layer into a polarizing layer held between the two dielectric substrates. Preferably, before jointing, the surface of the laminated layer is chemical-polished by CMP (chemicalmechano polishing), etc. Furthermore, preferably, to reduce the insertion loss, both the major surfaces of the jointed substrate are polished, after the thermal plastic deformation, by mechanical polishing, etc. and antireflection films are provided.

According to the production method of the polarizer of the present invention, metal particle layers comprising a large number of metal particles and dielectric layers are alternately built up on one major surface of at least one of two dielectric substrates having transparency to form a laminated layer, then the dielectric substrate on which the laminated layer has been built up is subjected to thermal plastic deformation in a direction to give the metal particles of the laminated layer morphological anisotropy and orientation, and in turn, to turn the laminated layer into a polarizing layer, after that, the above two dielectric substrates are jointed in such a way that the polarizing layer is sandwiched between the two substrates.

According to the polarizer and the production method thereof of the present invention, the polarizing layer, where the metal particles, to which morphological anisotropy has been imparted by the thermal plastic deformation, are oriented, is located virtually at the center, in the direction of thickness, of the polarizer, and bulk dielectrics are present on both major surfaces of the polarizer.

When antireflection films, etc. are to be formed on both the major surfaces of the polarizer, the cleanliness and smoothness of these surfaces are important. It may be necessary to adjust the thickness of the polarizer to adjust an optical path length and improve the design, strength, etc. In such a case, both major surfaces will need chemical polishing or mechanical polishing. As the polarizing layer is located at the center, in the direction of thickness, of the polarizer, bulk dielectric substrates are on the surface of the polarizer when the polarizer is subjected to the thermal plastic deformation and subsequent processes such as polishing. Hence the polarizer can fully endure various polishing. Even if surface roughness or deformation is generated in the ends of the polarizer by the above-mentioned working, the polarizing layer being located at the center thereof will not be affected at all. Accordingly, ample polishing allowances are available, and the thickness of the polarizer can be changed freely.

This, in turn, allows, in selecting methods of thermal plastic deformation, to select a method that is easy to practice and has a high mass-producibility out of some methods other than stretching, such as extrusion and rolling. When the outer surfaces are polished after the thermal plastic deformation, the surface smoothness of the polarizer will be improved to have excellent optical properties such as lower scattering and deviation of light. Moreover, surfaces of high smoothness are suitable for forming antireflection layers; thus a polarizer with little reflection can be realized. In the present context, polishing includes etching with HF solution, etc., chemical polishing such as CMP, and ordinary mechanical polishing with abrasive grains for polishing such as caesium oxide ($CeO_2$) and silicon carbide (SiC).

As the polarizing layer is located at the center and bulk substrates of high density are at the outer surfaces of the polarizer, it is hard for the external atmosphere to penetrate into the polarizer, thus the polarizer has high durability. Moreover, it is acceptable to joint two substrates after thermal plastic deformation in such a way that a polarizing layer will be located on the inner side to locate the polarizing layer at the center of the polarizer.

As described above, as the polarizing layer is virtually at the center and bulk dielectric substrates are on the surfaces of the polarizer, the polarizer according to the present invention has the following effects:

The exterior of the polarizer can be polished easily and in a simple manner; Any deformation generated by the thermal plastic deformation can be eliminated by giving surface polishing. As a result, the smoothness of the surfaces is improved, and loss of light due to scattering is reduced. On the polarizer of which surfaces have been polished to improve purity and smoothness, it is possible to form antireflection films that have excellent antireflection function and durability. As a result, a polarizer with excellent polarizing properties can be provided;

Such processes for thermal plastic deformation as rolling and extrusion other than stretching can be freely selected. This eliminates portions for holding the material to stretch that are needed in stretching. Thus waste of the material is eliminated;

There is no need of removing portions for holding the material after stretching. As a result, thermal plastic deformation that is simple and has high producibility can be realized. Moreover, a polarizer with excellent optical characteristics can be provided with high producibility and inexpensively;

Penetration of external atmosphere can be eliminated to the utmost. As a result, a polarizer can be provided that has excellent optical characteristics and high durability.

BRIEF DESCRIPTION OF THE DRAWINGS

FIG. 1 is a sectional view for explaining the polarizer according to the present invention.

FIG. 2(*a*) through (*e*) are process diagrams explaining the production method of the polarizer according to the present invention.

FIG. 7 is a perspective view schematically explaining the operation of the polarizer.

EMBODIMENTS

Figure 3:
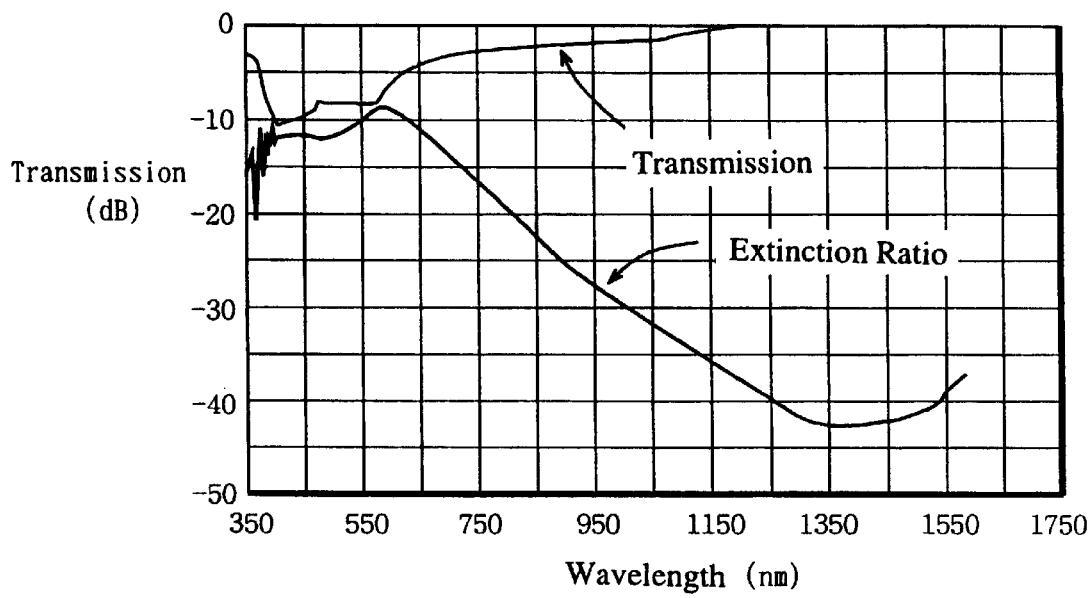
FIG. 3 is a diagram explaining the optical characteristics of one embodiment of the present invention.

In the following, with reference to the attached drawings, some embodiments of the present invention will be described in detail.

As shown in FIG. 1, a polarizer P1 is provided with dielectric substrates 1, 2 comprising transparent glass pieces on both major surfaces. A polarizing layer H1 is sandwiched between the dielectric substrates 1, 2. This polarizing layer H1 comprises metal particle layers 3 and dielectric layers 4 that are alternately laminated. In each metal particle layer 3, metal particles 3*a*, that have been imparted with anisotropy and orientation by thermal plastic deformation, are dispersed in the dielectric (dielectric layer 4). In the dielectric layer 4, the same dielectric with those of the dielectric substrates 1, 2 is used. Polarization is effected by a large number of metal particles 3*a* having morphological anisotropy and orientation in the polarizing layer H1 that is sandwiched between the dielectric substrates 1, 2. The polarizing layer H1 will be explained later.

First Production Method

The production method of the above polarizer will be explained with reference to FIG. 2(a) through (e). First, as shown in FIG. 2(a), metal particle layers 5 and dielectric layers 6 are alternately built up on a dielectric substrate 1 having transparency to form a laminated layer 7. The laminated layer 7 is formed by, for example, repeating several times the following processes (2) through (4):

(1) A process of preparing the dielectric substrate 1 comprising a transparent glass piece;

(2) A process of making a metal film comprising insular particles on the dielectric substrate 1 by sputtering;

(3) A process of heating the entire dielectric substrate 1 at a temperature that is lower than the glass gradual cooling temperature of the dielectric material of the dielectric substrate 1 to coagulate the insular metal particulates into metal particles 5a of the desired size; and (4) A process of forming, by sputtering, a dielectric layer 6 on the metal particle layer 5 comprising a large number of metal particles 5a.

Next, as shown in FIG. 2(b), the surface of the dielectric substrate 1, on the side of the formation of the laminated layer 7, is polished by the CMP method or the SOYTON-POLISH method (SOYTON is a product of Monsanto Co. and its trademark) to be a surface that has a mean flatness of 10 $\mu$m or under and a mean surface roughness of 1 nm or under, is free of affected layer, and is hydrophilic.

The above polishing methods can polish in the order of several nanometers and achieve very precise polishing without giving any damages to the lower layers beneath the polished layer (the interior of the laminated layer 7). Moreover, as polishing is given before thermal plastic deformation, there will be almost no surface deformation or surface roughness, in contrast with the case of polishing after thermal plastic deformation; the depth of a layer to be removed by polishing is several tens of nanometers at the most. This depth of polishing is extremely small whereas polishing after thermal plastic deformation requires polishing depth of several micrometers to several tens of micrometers or 100 micrometers or more in some cases. Simple mechanical polishing is not adequate. Such polishing will leave an affected layer that has been chemically changed by polishing although the flatness and the surface roughness may meet the desired values, and the polished surfaces can not be jointed.

The polishing method of the SOYTON-POLISH is a kind of chemical polishing and comprises a polishing process and a cleaning process. In the polishing process, a polishing pad 16 is used to polish the surface in ultrapure water, then the surface is polished with colloidal silica 17 that is $SiO_2$ particles of mean grain size of 30 nm suspended in NaOH solution. The cleaning process comprises the following eight steps: (1) Ultrasonic bath with alcohol; (2) Ultrasonic bath with ultrapure water; (3) Ultrasonic bath with a mixture of sulfuric acid and hydrogen peroxide; (4) Ultrasonic bath with a mixture of ammonia and hydrogen peroxide; (5) Immersion in fluoric acid solution; (6) Immersion in nitric acid solution; (7) Polishing in ultrapure water; and (8) Drying with a spin drier. The work is rinsed with ultrapure water between the steps.

Next, the above process of forming the laminated layer 7 and the above process of polishing are given to the other dielectric substrate. As shown in FIG. 2(c), the face of the laminated layer 7 of one dielectric substrate 1 and the face of the laminated layer 7 of the other dielectric substrate 2 are jointed together to produce a jointed substrate S. It should be noted here that formation of the laminated layer 7 may be omitted for the other dielectric substrate 2. In that case, the above polishing process is given to one major surface (the face to be jointed with the dielectric substrate 1) of the other dielectric substrate 2.

When faces that were given chemical polishing are brought together to contact with each other, the two faces naturally adsorb each other due to vander Waals force. In this way, the jointed substrate is produced. When the jointed substrate is heated at a temperature below the glass softening point of the dielectric substrates, a joint that is strong on the level of atoms at the surfaces will be obtained.

After that, as shown in FIG. 2(d), the entire jointed substrate S is heated and stretched in a certain direction to give thermal plastic deformation. As a result, the metal particles 5a dispersed in the laminated layer 7 are deformed into spheroids and acquire morphological anisotropy, and the metal particles 5a are oriented in the stretching direction. In this way, a polarizer P1 is produced, that has a polarizing layer H1 at the center as shown in FIG. 1. Finally, as shown in FIG. 2(e), both the outer major surfaces of the jointed substrate S are polished, and an antireflection film 8 is formed on each major surface. It should be noted that for the sake of simplicity, illustration of metal particles is omitted in FIG. 2(b) through (e).

Materials suitable for the dielectric substrates 1, 2 include BK-7 glass (a product of HOYA Inc.: $SiO_2$ is 69 wt % approx., and $B_2O_3$ is 10 wt % approx.), Pyrex glass (Corning Inc. #7740: $SiO_2$ is 83 wt % approx., and $B_2O_3$ is about 13 wt % approx.), both being borosilicate glasses, and vitreous silica. The same materials for the dielectric substrates 1, 2 are suitable for the dielectric layers 4. For the metal particle layers 3, Au, Ag, Cu, Fe, Ni, Cr, etc. are suitable. The antireflection films 8 are a single layer or multiple layers of dielectric materials such as $TiO_2$, $SiO_2$, and MgO. As for methods for effecting thermal plastic deformation, in addition to stretching, a method that is simple and has a high mass-producibility can be selected from, for example, extrusion and rolling.

Second Production Method

In addition to the above production method, polishing of the polarizer can be made with ease by the following method also to provide an excellent polarizer.

First, two dielectric substrates having transparency are prepared. The above laminated layer is formed on one major surface of at least one of these dielectric substrates, then the surface of the layer is subjected to SOYTON-POLISH polishing. Before making a jointed substrate, however, the dielectric substrate on which the laminated layer was formed is given thermal plastic deformation in a certain direction to form metal particles having morphological anisotropy and orientation; thus the dielectric substrate is turned into a deformed substrate. After that, the film surface of one deformed substrate and the film surface of the other deformed substrate or one major surface of the other dielectric substrate are jointed together to form a jointed substrate or polarizer wherein two substrates are jointed.

Test Cases

Specific test cases will be described below.

Polarizer Produced by the First Production Method

Case 1

In a polarizer P1 produced, as shown in FIG. 1, the dielectric substrates 1, 2 and the dielectric layers 4 are BK-7, a kind of borosilicate glass, and the metal particle layers 3 are Cu. This polarizer P1 was produced as follows: First, as shown in FIG. 2 (a), five metal particle layers 3 and five dielectric layers 4 were alternately made (it should be noted that individual metal particles are dispersed in the dielectric layers). Each dielectric layer 6 was made to have a thickness of about 200 nm (the uppermost layer, however, was made thicker than the other layers because the uppermost layer needs polishing in the later stage). The surface of the laminated layer of each dielectric substrate was given chemical polishing by a SOYTON-POLISH apparatus, then the two substrates were jointed, with the laminated layers being placed on the inner side. The faces of the laminated layers were adsorbed with each other due to vander Waals force. Then the two substrates were heat-treated in atmosphere at about 550° C. (being lower than the gradual cooling point 577° C. of the dielectric substrate 1, and being higher than the strain point 548° C. thereof; or near the transition point 580° C.) for about 10 hours to produce a jointed substrate that has a strong face-to-face joint. The jointed substrate was stretched at about 620° C. (between the softening point 724° C. and the gradual cooling point 577° C.), and both faces of the jointed substrate were polished by CMP and provided with antireflection films 8, each comprising multiple layers of $TiO_2$ and $SiO_2$.

Next, the optical properties of the polarizer thus obtained were measured. The results are as shown in FIG. 3. In this diagram, the transmission loss of the polarized light in the transmission direction of the polarizer is shown as the insertion loss, and the difference in transmission loss between the cutoff direction and transmission direction is shown as the extinction ratio. As is clear from FIG. 3, at the wavelength of 1310 nm, the insertion loss was 0.1 dB and the extinction ratio was 42 dB. Thus excellent polarization properties were obtained. When the above-mentioned polishing was not given, the insertion loss exceeded 1 dB in some cases, due to increased scattering, etc.

Case 2

Figure 4:
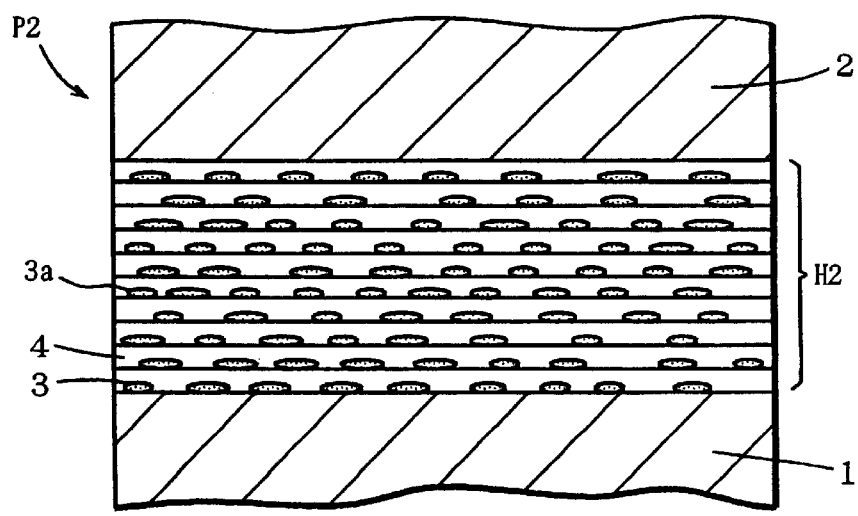
FIG. 4 is a diagram explaining the embodiment of the present invention, and is a sectional view showing the polarizer wherein a laminated layer is formed on only one of the dielectric substrates jointed together.

FIG. 4 is a diagram explaining another embodiment. The same metal particle layers 3 with those of Case 1 and the same dielectric layers 4 with those of Case 1 were used. Ten layers each were alternately formed on one major surface of a dielectric substrate 1 to form a laminated layer. After that, the surface of the laminated layer was polished by CMP to form a face of which mean flatness was 10 μm or under and mean surface roughness was 1 nm or under, the face being free of any affected layer. One major surface of the other dielectric substrate 2, on which no laminated layer was formed, was polished by CMP. These polished surfaces were brought together to have a face-to-face contact.

Figure 5:
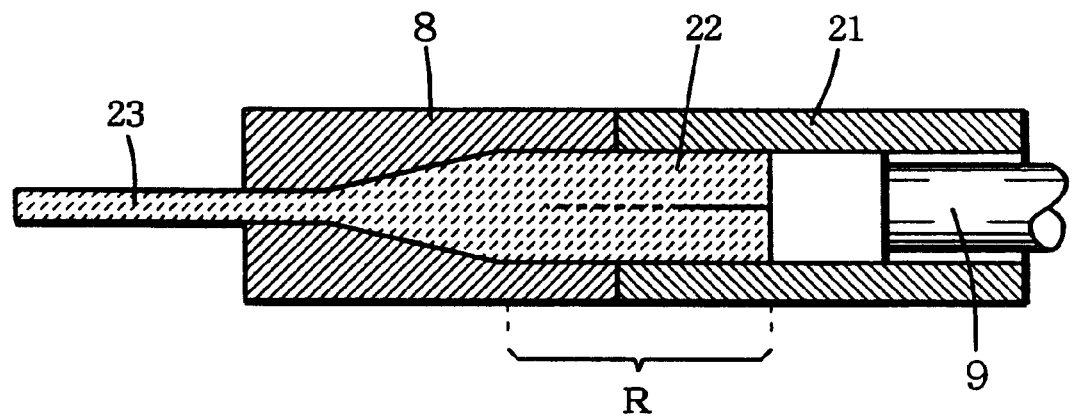
FIG. 5 is a sectional view schematically explaining thermal plastic deformation of the extrusion method.

Next, an extruder as shown in FIG. 5 was used to give thermal plastic deformation to the work. To be more precise, pressure was applied to the work in vertical direction (direction perpendicular to the major surface of the dielectric substrate 1) at about 550° C. in a heating and pressurizing zone inside the extruder to make the face-to-face joint. Then a mold 8 was used to give thermal plastic deformation. As the surface of the work contacted the mold 8, the surface layer was damaged. However, the region that would become a polarizing layer H2 was located virtually at the center of the jointed substrate and was not affected. After that, the surface roughness was removed by surface polishing, and an antireflection film was formed on each surface. As a result, an excellent polarizer of which insertion loss was as low as that of the embodiment 1 was produced successfully. When the stretching method is used, some portions for holding the material are normally required to stretch the material. These portions, however, are not required after stretching, resulting in waste of the material and the time and trouble required by working. These holding portions are not required at all when extrusion is used.

Case 3

Figure 6:
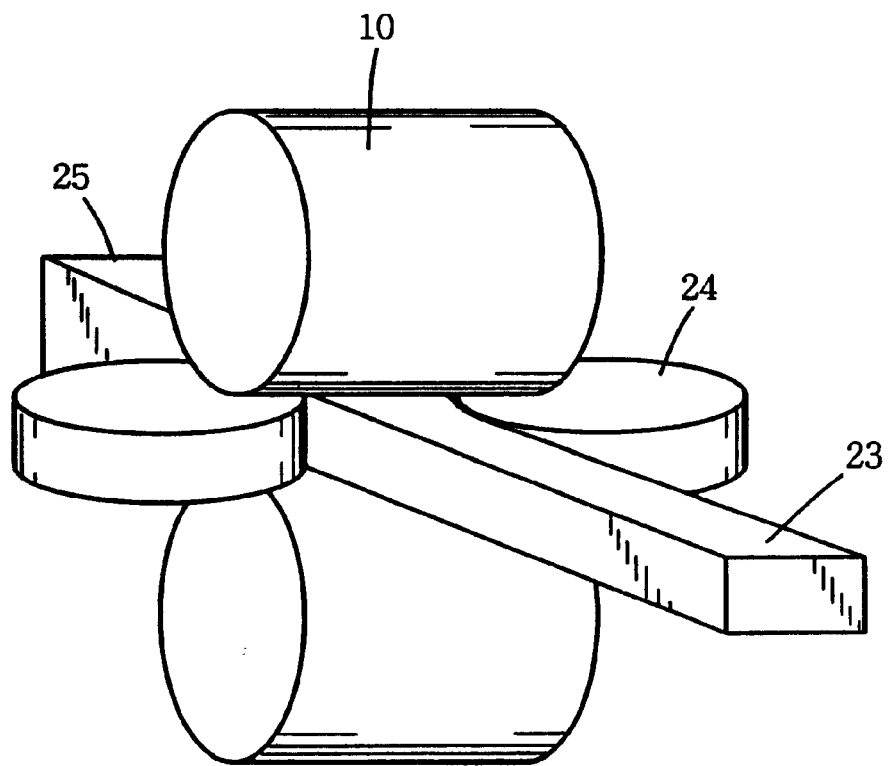
FIG. 6 is a perspective view schematically explaining thermal plastic deformation of the rolling method.

FIG. 6 shows a method wherein a laminated layer is formed on one major surface of a dielectric substrate 1, the surface of the laminated layer is polished by CMP, one major surface of a dielectric substrate 2 on which no laminated layer is formed is also polished by CMP, then the respective polished surfaces were made to have face-to-face contact on the inner side of the two dielectric substrates, and face-to-face jointing and thermal plastic deformation are effected by a heating roller 10.

According to this method, like the case 1, surface polishing and formation of antireflection films were executed after thermal plastic deformation, and an excellent polarizer of which insertion loss was as low as that of the case 1 was produced successfully. This rolling method, just like the extrusion method, did not require any holding portions, thus the jointed substrate was successfully used up without producing any wasted portion. Drawing through a mold is another available method of thermal plastic deformation.

Polarizer Produced by the Second Production Method

Case 4

The same method with the case 1 was used to up to the formation of the laminated layers. Moreover, thermal plastic deformation was effected under the same conditions with the case 1 to produce two deformed substrates. The surface of the laminated layer of each deformed substrate was given the same chemical polishing with the case 1. Then the surfaces of these laminated layers were jointed, and finally antireflection films were formed on the substrates to produce a polarizer. The polarizer exhibited optical properties that were virtually identical to those of the case 1. Thus an excellent polarizer was produced successfully.

In the case 1, thermal plastic deformation is given after jointing the dielectric substrates. If any defect is generated in this deformation process, both dielectric substrates on which laminated layers have been made will be wasted. In contrast, if jointing is made after thermal plastic deformation, such a waste can be avoided.

Moreover, in the present case, both the outer major surfaces of the dielectric substrates can be polished after thermal plastic deformation. Hence ample polishing w allowances can be provided to make polishing easier, and the overall thickness of the polarizer can be altered freely.

What is claimed is:

1. A method of producing a polarizer, comprising:
   providing two dielectric substrates each having a transparency and made of glass having a glass gradual cooling temperature and a strain temperature lower than the glass gradual cooling temperature;
   alternately laminating metal particle layers comprising a plurality of metal particles and dielectric layers on a surface of at least one of the two dielectric substrates to form a laminated layer thereon;
   chemically polishing an exposed surface of the laminated layer in such a way that the exposed surface has a mean flatness of at most 10 μm and a mean surface roughness of at most 1 nm;
   joining the two dielectric substrates so that the laminated layer is disposed therebetween to form a joined substrate;
   heat-treating the joined substrate at a temperature being lower than the glass gradual cooling temperature and higher than the strain temperature; and
   subjecting the joined substrate to thermal plastic deformation in a predetermined direction, whereby the metal particles in the laminated layer are imparted morphological anisotropy and a predetermined orientation, and whereby the laminated layer forms a polarizing layer, wherein the step of alternately laminating comprises:
- (b) forming insular metal particles on a surface of at least one of the two glass substrates;
- (c) heating the glass substrate to a temperature lower than the glass gradual cooling temperature to coagulate the metal particles;
- (d) forming a dielectric layer over the coagulated metal particles;
- (e) forming insular metal particles on the dielectric layer formed in step (d); and
- (f) repeating steps (c)–(e).

2. The method of claim 1, wherein the thermal plastic deformation step comprises stretching the joint substrate at an elevated temperature.

3. The method of claim 1, wherein the thermal plastic deformation step comprises extruding the joint substrate using an extruder at an elevated temperature.

4. The method of claim 1, wherein the thermal plastic deformation step comprises pressing the joint substrate with rollers at an elevated temperature.

5. The method of claim 1, further comprising the step of polishing a surface of the laminated layer before joining the dielectric substrates.

6. The method of claim 5, wherein the polishing step comprises chemically polishing the surface of the laminated layer.

7. The method of claim 1, further comprising:

polishing exposed surfaces of the joined substrate after thermal plastic deformation; and forming an antireflection film on each exposed surface of the joined substrate.

8. A method of producing a polarizer, comprising:

providing two dielectric substrates each having a transparency and made of glass having a glass gradual cooling temperature;

alternately laminating metal particle layers comprising a plurality of metal particles and dielectric layers on a surface of at least one of the two dielectric substrates to form a laminated layer thereon;

subjecting the dielectric substrate on which the lamination layer is formed to thermal plastic deformation in a predetermined direction, whereby the metal particles in the laminated layer are imparted morphological anisotropy and a predetermined orientation, and whereby the laminated layer forms a polarizing layer;

chemically polishing an exposed surface of the laminated layer; and joining the two dielectric substrates so that the laminated layer is disposed therebetween to form a joined substrate, wherein the step of alternately laminating comprises:
- (b) forming insular metal particles on a surface of at least one of the two glass substrates;
- (c) heating the glass substrate to a temperature lower than the glass gradual cooling temperature to coagulate the metal particles;
- (d) forming a dielectric layer over the coagulated metal particles;
- (e) forming insular metal particles on the dielectric layer formed in step (d); and
- (f) repeating steps (c)–(e).

9. The method of claim 8, further comprising the step of polishing a surface of the laminated layer before joining the dielectric substrates.

10. The method of claim 8, wherein the polishing step comprises chemically polishing the surface of the laminated layer.

11. The method of claim 8, further comprising:

polishing exposed surfaces of the joined substrate; and forming an antireflection film on each exposed surface of the joined substrate.

* * * * *